May 30, 1967 A. T. PARRELLA ETAL 3,321,869

MACHINE TOOL

Filed July 13, 1964 3 Sheets-Sheet 1

INVENTORS
Alfred T. Parrella
Gene. R. Gagliardi

BY Rockwell and De Lio

ATTORNEYS

May 30, 1967  A. T. PARRELLA ET AL  3,321,869
MACHINE TOOL
Filed July 13, 1964  3 Sheets-Sheet 3
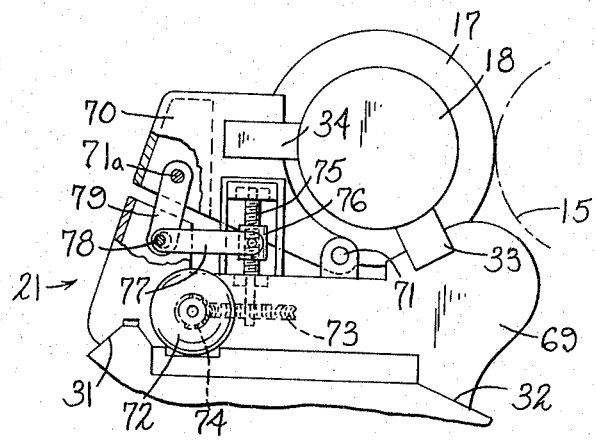
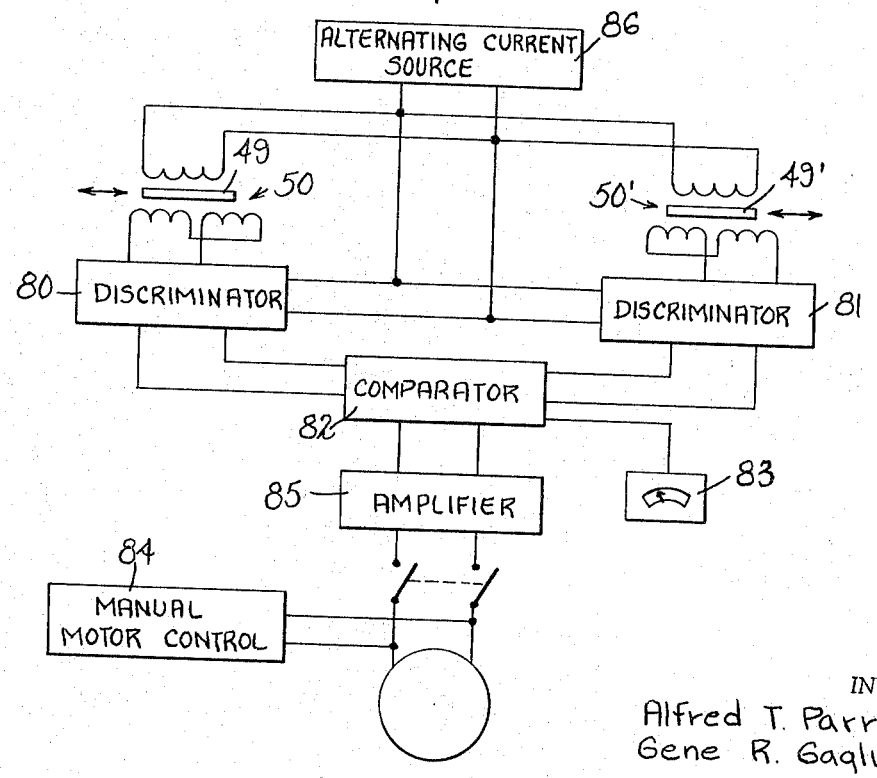
INVENTORS
Alfred T. Parrella
Gene R. Gagliardi

United States Patent Office 3,321,869
Patented May 30, 1967

3,321,869
MACHINE TOOL
Alfred T. Parrella, Newtown, and Gene R. Gagliardi, Bethany, Conn., assignors to Farrel Corporation, Ansonia, Conn.
Filed July 13, 1964, Ser. No. 382,190
6 Claims. (Cl. 51—165)

This invention relates to machine tools, and more particularly relates to machine tools having means for measuring the diameter of a cylindrical workpiece mounted thereon.

The invention may be employed to advantage in roll grinding machines and will, therefore, be disclosed with reference to such a machine. A roll grinder in which this invention may be embodied is disclosed in U.S. Patent No. 3,088,250. Over a period of time mill rolls, such as may be used in steel mills for rolling steel, wear beyond permissible operating limit. This wear necessitates the regrinding of these rolls to provide the rolls with the surface characteristics necessary for proper operation in a mill. In such instances when the roll is placed on the grinding machine it is necessary to determine the existing diameter thereof to determine how much roll material may be removed when reground. Additionally, it will be necessary at the completion of the grinding operation or during the grinding operation to check the diameter of the roll to determine that it is being reground to the proper dimensions.

This invention provides a new and improved machine having means for accurately and simply measuring the radius of a cylindrical object or a cylindrical portion of an object and, therefore, measuring the diameter thereof.

Briefly stated, the invention in one form thereof as incorporated in a machine tool comprises a probing member movable toward a cylindrical object to be gauged. Movement of this probe member is coordinated with a reference axis so that movement of the probe member is detected to measure a distance between the surface of the cylindrical object and the reference axis. Further means are provided to detect the center or axis of the cylindrical object and the distance of this axis from the reference axis. Both the center detecting device and the probing means emit signals indicative of the distance from the reference axis. Means are then provided to move the probing member until it emits a signal equal but opposite to the signal from the center detecting means. The resultant travel of the probing member is then a measure of the radius and, hence, the diameter of the cylindrical object.

Accordingly, it is an object of this invention to provide a new and improved apparatus for measuring the radius and, hence, the diameter of a cylindrical workpiece.

Another object of this invention is to provide a new and improved means in a roll grinding machine to detect the diameter of a mill roll placed on the machine.

A further object of this invention is to provide a new and improved means for detecting the diameter of a cylindrical object.

The features of the invention which are believed to be novel are pointed out with particularity and distinctly claimed in the concluding portion of this specification. However, the invention both as to its organization and operation, together with further objects and advantages thereof, may best be appreciated by reference to the following detailed description taken in conjunction with the drawings in which:

FIG. 6 is a view partly in section and partly cut away showing the mechanism for moving the roll support; and FIG. 7 is a diagram partly in block form and partly schematic showing a network for detecting misalignment of the axis of the roll with respect to a reference line and operating the mechanism of FIG. 6 to align the roll.

Figure 1:
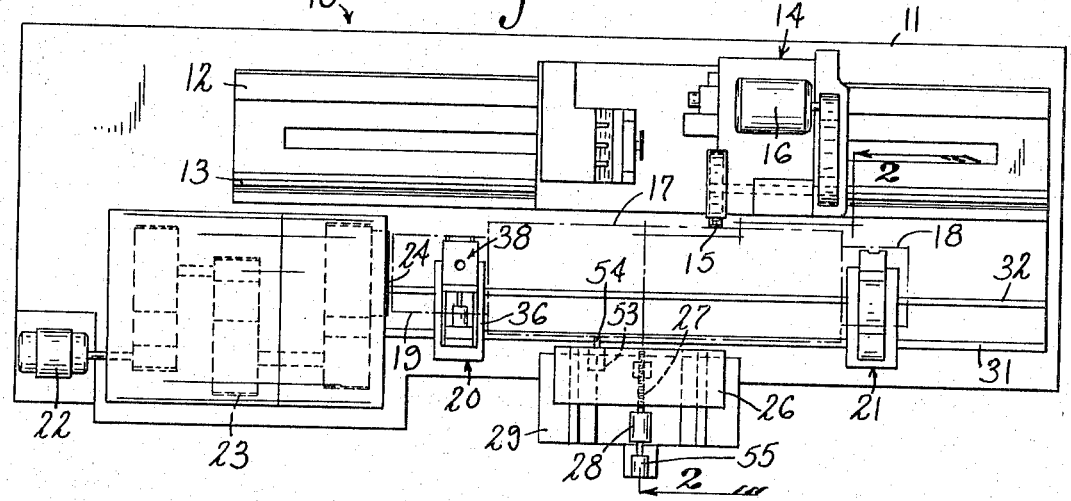
FIG. 1 is a plan view of the roll grinding machine which incorporates the invention.

The invention may be embodied in a roll grinder, generally indicated by the reference numeral 10, comprising a bed or frame 11 having ways 12 and 13 thereon which in turn have mounted thereon a grinding assembly 14 movable in either direction along the ways. The grinding assembly includes a grinding wheel 15 and drive motor 16 therefor, adapted to operate upon a mill roll 17. Roll 17 is supported at each end thereof at journals 18 and 19 on journal or neck supports 20 and 21, respectively. The journal or neck supports 20 and 21 may be of the construction shown in the aforementioned Patent 3,088,250.

Roll 17 is adapted to be turned on supports 20 and 21 by a drive motor 22 through suitable gearing means 23. Journal 19 of roll 17 is suitably chucked to a head stock 24 and the axis of rotation of head stock 24 may be considered a reference axis for purposes hereinafter described.

A probe carrying means, hereinafter referred to as a probe table 26, is mounted on the machine opposite grinding wheel 15 and is movable toward and away from the roll 17 on a lead screw 27 driven by motor 28. Motor 28 is carried on a platform 29 mounted to bed 11. Probe table 26 is so arranged that upon energization of motor 28 it moves perpendicular to the axis of rotation of head stock 24.

The journal supports 20 and 21 comprise a base member 30 positionable along the length of base or bed 11 on ways 31 and 32. The roll journals are supported directly on bearing blocks 33 and 34 carried by the base members 30. Each of the journal supports 20 and 21 is provided with means (only one shown) for detecting the center of the journal which it supports and, therefore, the center or axis of the roll. Only the detecting means associated with journal 20 is specifically illustrated. Carried on each of base members 30 is an upright member 36 having a roll center detecting device pivotally mounted thereto at 37. Center detecting device generally indicated by the reference numeral 38 is pivotal away from the roll in a counter-clockwise direction as viewed in FIG. 2. Detecting means 38 comprises a pivotal member 39 carrying a pair of guide rods 40 (only one shown). Pivotal member 39 is so arranged that it engages a stop lug 41 when guide rods 40 reside in a horizontal plane. A member 42 is slidably mounted on guide rods 40 and carries thereon a center detecting member 43 which comprises a vertically extending (as illustrated) stem 44. Stem 44 carries thereon a member 45 which is symmetrically disposed with respect to the center line or axis of stem 44. Member 45 carries thereon roller probes 46 and 47 which are also symmetrically disposed with respect to the vertical center line of stem 44. Biasing means, such as a spring 48, is provided to urge member 45 towards engagement with roll journal 19.

It will be apparent that when roller probes 46 and 47 are seated on journal 19 the center line of stem 44 passes through the center of journal 19. Member 42 carries thereon a plunger 49 arranged to move the core of a linear variable differential transformer 50, mounted on portion 51 of pivotal member 39. It may now be seen that movement of member 42 along guide rods 40 to properly position member 45 to detect the center of journal 19 will produce a movement of plunger 49 and, hence, the core of linear variable differential transformer 50.

It is to be understood that a roll center detecting device 38 is provided at each journal support and utilized to align the axis of roll 17 with a reference axis and the path of travel of grinding wheel 15 along ways 12 and 13.

The disclosed center detecting apparatus together with means of aligning the axis of roll 17 with respect to a reference axis is disclosed and claimed in our co-pending application Ser. No. 332,018, filed Dec. 20, 1963, now Patent No. 3,281,995, dated Nov. 1, 1966, assigned to the same assignee as the present invention. The disclosure of the referenced application is incorporated herein by reference. That application discloses and claims apparatus for aligning the axis of roll 17 with respect to a reference axis and includes means for adjusting the position of one of the journals on its support to effect such alignment. Such adjusting means is also disclosed in the aforementioned patent. More specifically, the referenced application discloses a machine wherein two detecting means, such as shown at 38 are arranged to detect the center of each journal. Other apparatus responsive to the detecting means determines the distance of the center of each journal from a reference line and moves one journal support until the axis of the roll is aligned with the reference line. The relation of the roll center detecting means and movement of one journal support in response thereto is hereinafter described in conjunction with FIGS. 6 and 7.

For reasons which will hereinafter be made apparent the axis of roll 17 is initially aligned parallel to a reference axis or the direction of travel of grinding assembly 14 along ways 12 and 13.

Figure 2:
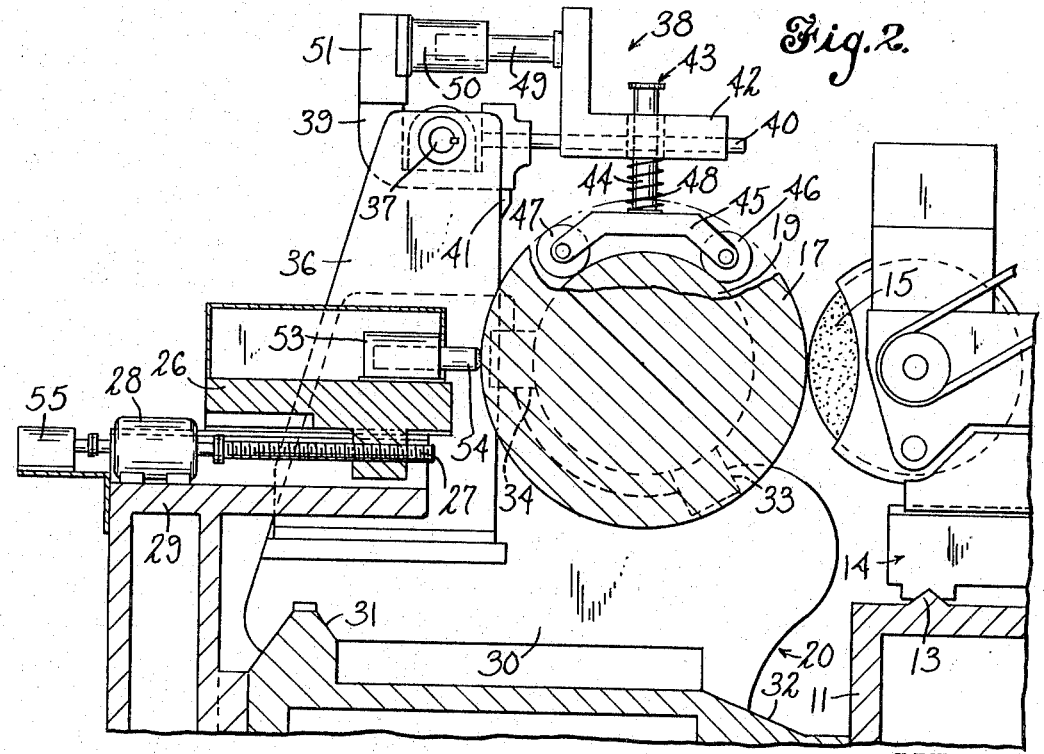
FIG. 2 is a sectional view of the roll grinding machine of FIG. 1 seen along line 2—2 of FIG. 1.

Carried on probe table 26 is a linear variable differential transformer 53 which is positioned to engage roll 17 essentially at a point which resides in a horizontal plane, as viewed in FIG. 2, through the axis of roll 17. As is well known to those skilled in the art, a linear variable differential transformer is a transformer designed with two secondaries and a linearly movable core that are so arranged that in some position of the movable core, the output from each individual secondary is of equal amplitude and of the same phase relation. The secondary windings are connected in series opposition so that the outputs tend to cancel, and are distributed in such a manner that any physical displacement of the core causes the voltage in one secondary to increase while simultaneously reducing the voltage appearing in the other secondary. The difference between the voltages appears across the output terminals of the serially opposed secondaries and gives a measure of the physical position of the core. By detecting the magnitude of the output and the phase difference between the primary excitation voltage and the output voltage, linear movement of the core is detected. These devices give an extremely accurate indication of linear displacement of the core and are available from many sources. One source is Daytronic Corporation of Dayton, Ohio, whose model 16 SSB Linear Variable Differential Transformer, has been satisfactorily utilized in a structure exemplified in FIG. 2. Linear variable differential transformer 53 is arranged to measure the distance between the surface of a roll 17 and a reference axis which in this instance will be exemplified as the axis of rotation of head stock 24.

Coupled to the shaft of motor 28 opposite the end driving lead screw 27 is a digital shaft encoder 55 which measures the rotation of the shaft of motor 28 and hence the rotation of lead screw 27. Measure of the rotation of lead screw 27 is, therefore, a measure of the linear distance of movement of probe table 26 toward or away from the surface of roll 17. Shaft encoder 55 is of the type which provides an electrical indication of the degree of rotation of its shaft. The electrical indication is in digital form and may be utilized by a suitable printer or other visual readout device. Shaft encoder 55 provides a continuous indication of the position of table 26 on lead screw 27 from a reference point. For example, shaft encoder 55 may be adjusted to give zero output when plunger 54 engages an object and places the core of transformer 53 in a neutral or null position. Thereafter, as lead screw 27 is rotated to move plunger 54 away from roll 17, shaft encoder 55 will indicate the instantaneous distance of plunger 54 from the face roll 17. A suitable shaft encoder of the type described is one designated type C5DT and available under the trademark "Digitizer" from Coleman Electronics, Inc., Gardena, Calif.

Figure 4:
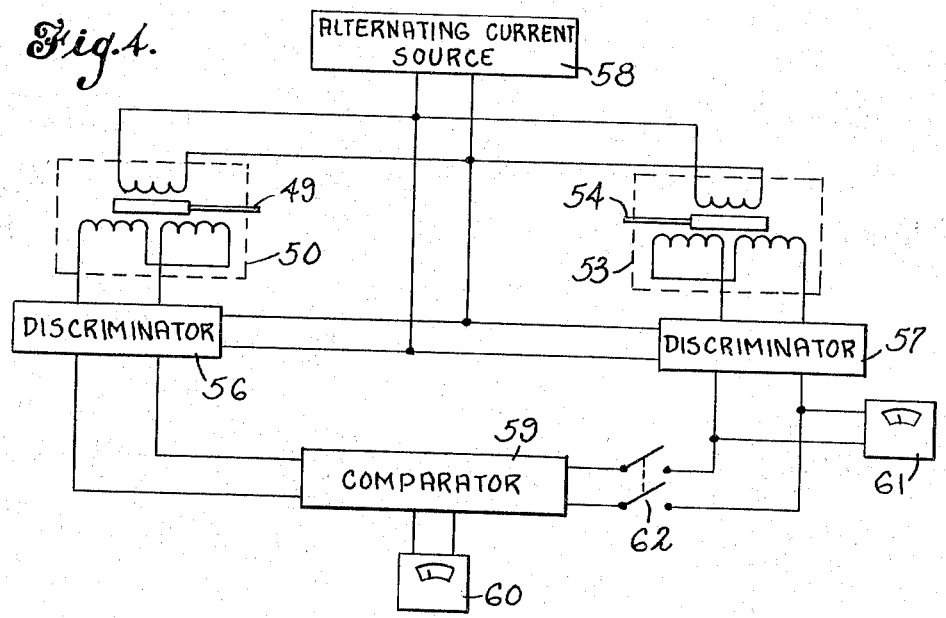
FIG. 4 is an electrical diagram partly in schematic and partly in block form illustrating an electrical detecting means used in conjunction with the apparatus of FIGS. 1 and 2.
Figure 3:
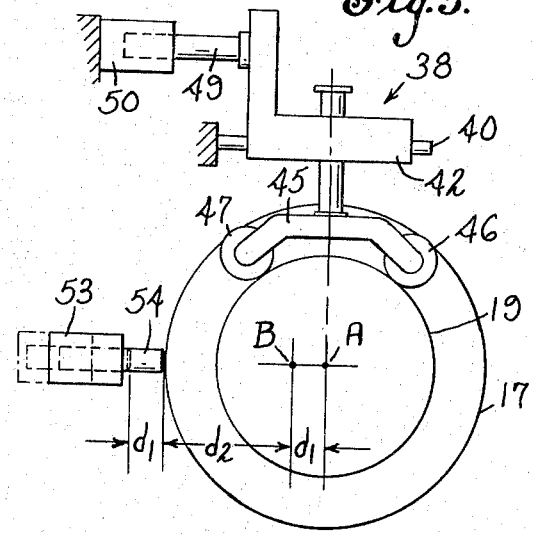
FIG. 3 is a diagrammatic end view of a roll and apparatus for measuring the diameter thereof.
Figure 5:
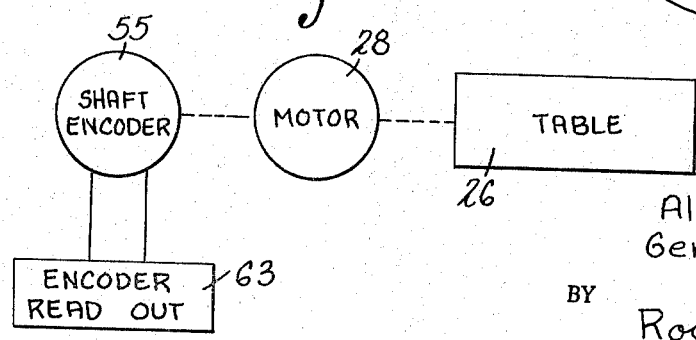
FIG. 5 is a block diagram of apparatus for detecting the position of the surface of a roll and indicating the distance between the surface of the roll and a reference axis.

For an explanation of the operation of the mechanisms disclosed in FIGS. 1 and 2 reference is now made to FIGS. 3, 4 and 5. FIG. 3 diagrammatically illustrates roll 17 and the relationship of the linear variable differential transformers 50 and 53 thereto. For purposes of explanation, the axis of the roll when initially placed on the machine is represented at A, FIG. 3, and the axis of rotation of the head stock which may be considered to be a reference axis is represented at B. Referring briefly to FIG. 4 which illustrates a comparison or measuring circuit utilizing the linear variable differential transformers, it is pointed out that each transformer 50 and 53 has operatively associated therewith a discriminator 56 and 57, respectively, which yield a direct current output voltage of a magnitude and polarity indicative of the degree of displacement of the cores of the transformers from a null position. The primary windings of the transformers 50 and 53 are excited from a common source of alternating current identified by the reference numeral 58. The discriminators 56 and 57 compare the phase and amplitude of the secondary voltages with the primary winding voltage to determine the displacement of the transformer cores. The discriminators 56 and 57 then provide a direct current voltage proportional in magnitude to displacement of the associated cores and having a polarity indicative of the direction of displacement. The displacement of each core may be visually observed on meters 60 and 61 when switch 62 is open. Alternatively, the signals from each discriminator are algebraically added in comparator 59 and the resultant indicated by meter 60 when switch 62 is closed.

In measuring the diameter of roll 17, shaft encoder 55 is first calibrated to read the distance from the axis of rotation of head stock 24. Motor 28 is operated to drive the table 26 until the core of transformer 53 is in a neutral or null position at a predetermined distance from the axis of rotation of head stock 24. Then, shaft encoder 55 is adjusted to yield an output indicative of the predetermined distance from the axis. For example, transformer 53 may be initially nulled at axis B and set for zero output. Then as motor 28 is operated to move table 26 away from roll 17 shaft encoder 55 will indicate the distance table 26 is retracted from axis B. The shaft encoder 55 and transformer 53 thus comprise a position responsive means which indicates the distance of the transformer 53 from the reference axis B.

Let it be assumed that the axis A of the roll 17 has been aligned with axis B. If axes A and B coincide, the core of transformer 50 will be in a null position, there will be no output from discriminator 57, and shaft encoder 55 will indicate the radius or diameter of roll 17. However, if the axis A of roll 17 is slightly offset with respect to axis B as diagrammatically shown in FIG. 3, by the distance $d_1$, discriminator 57 will yield a direct current output having a magnitude proportional to the distance $d_1$ and a polarity indicative of the direction of displacement of axis A with respect to axis B. Motor 28 is operated to move probe table 26 until plunger 54 engages roll 17 and the core of transformer 53 is placed in a neutral or null position. At this time comparator 59 will read the off center position of roll 17 and shaft encoder 55 gives an output which is indicative of the distance $d_2$. Then motor 28 is energized to drive table 26 away from roll 17. When this is done, the core of transformer 53 departs from a null position and discriminator 56 will provide a direct current signal of opposite polarity to that of discriminator 57. Motor 28 is operated to move table 26 until the signals appearing at meters 60 and 61 are equal and opposite or, alternatively stated, until the output of comparator 59 is zero. At this time shaft encoder 55 will furnish a signal indicative of the position of probe table 26 with respect to axis B which is the distance $d_2$ plus the distance $d_1$. The encoder therefore reads the radius of roll 17. As shown in FIG. 5 the electrical output of encoder 55 is applied to a readout device 63 which may be a suitable printer or other visual indicator which now gives the radius of roll 17.

If a multiplying factor of two is introduced into the readout device, it will give the diameter measurement directly.

To further exemplify the manner in which the roll may be moved to align it with respect to the path of travel of grinding wheel 15 reference may be had to FIG. 6. Means are provided on journal support 21 to move roll neck or journal 18 towards or away from grinding wheel 15 to properly align the axis of the roll with respect to the path of travel of grinding wheel 15.

Journal 18 is mounted on support 21 by means of bearings 33 and 34. Bearing 33 is mounted in the main body 69 of support 21 and bearing 34 is carried in an arm 70 pivotally mounted to body 69, as indicated at 71. Roll support body 69 is positionable along the bed on ways 31 and 32. Arm 70 is pivotal with respect to body 69 to allow adjustment of bearing 34 in a horizontal direction as viewed in FIGS. 2 and 6 and thereby allow horizontal adjustment of the axis of roll 17.

Power drive means are provided to predetermine the position of arm 70. The drive means comprises a motor 72, carried on body 69, which drives a gear 73 through pinion 74 on the motor shaft. Gear 73 drives a lead screw 75. Rotation of lead screw 75 produces upward or downward movement of nut 76 thereon dependent upon the direction of rotation of motor 72. Movement of nut 76 operates link 77. Lnk 77 is keyed to and operates to rotate eccentric shaft 78. Carried on shaft 78 is a pair of links 79 (only one shown) which are pivoted at the other end thereof to arm 70 at 71a. Rotation of eccentric shaft 78 will produce rotative motion of arm 70 about pivot 71. This rotative motion of arm 70 causes neck support bearing 34 mounted on arm 70 to move inwardly or outwardly with respect to grinding wheel 15 to move journal 18 toward or away from grinding wheel 15.

FIG. 7 illustrates an electrical measuring system similar to that shown in FIG. 4 using linear variable differential transformers 50 and 50' to measure the distance of the journal centers from the reference axes. Here the measured distances are detected in discriminators 80 and 81 and compared in a comparator 82. The resultant error may be visually indicated on a meter 83 and a manual motor control 84 actuated to operate motor 72. Alternatively, an amplifier 85 may be utilized to sense the direction in magnitude of the error and operate motor 72 to nullify the measured error and thereby align the roll axis with respect to a reference axis. Discriminators 80 and 81 compare the magnitude and phases of the primary voltage of alternating current source 86 with the magnitudes and phases of the secondary voltages of the linear variable differential transformers. Discriminators 80 and 81 then yield a signal indicative of movement of cores 49 and 49', respectively.

It will thus be seen that the objects of the invention are efficiently attained. While a preferred embodiment of the invention has been set forth for purposes of disclosure, modifications to the disclosed embodiment of the invention as well as other embodiments thereof may occur to those skilled in the art. Accordingly, it is intended to include in the scope of the appended claims all changes and modifications of the invention which do not depart from the spirit and scope of the invention.

What is claimed is:

1. In combination with a machine tool having means for supporting a cylindrical object and aligning the axis thereof with a reference axis, means for detecting the longitudinal axis of the workpiece, first means providing a first signal proportional to the distance from the axis of the workpiece to the reference axis, position responsive means providing a zero signal at a predetermined distance from the reference axis, said position responsive means being effective to provide a signal proportional to its displacement and direction of displacement from said predetermined position, means for moving said position responsive means to a position where the signal therefrom is equal and opposite to the signal from said first means, and means for indicating the distance between said position responsive means and said reference axis.

2. In combination with roll grinding apparatus having means for supporting a roll and aligning the axis thereof with a reference axis, means for detecting the longitudinal axis of the roll, first means providing a first signal proportional in magnitude to the distance from the axis of the roll to the reference axis and having a polarity indicative of the direction of displacement of the center with respect to the reference axis, position responsive means providing a zero signal at a predetermined distance from the reference axis, said position responsive means being effective to provide a signal proportional in magnitude to its displacement from said predetermined position and of a polarity indicative of the direction of displacement of said position responsive means from the reference axis, means for moving said position responsive means to a position where the signal therefrom is equal and opposite to the signal from said first means, and means for indicating the distance between said position responsive means and said reference axis.

3. In combination with roll grinding apparatus having means for supporting a roll and aligning the axis thereof with a reference axis, means for detecting the longitudinal axis of the roll, first means providing a first signal proportional to the distance from the center of the roll to the reference axis, position responsive means providing a signal of known magnitude at a predetermined distance from the reference axis, said position responsive means being effective to provide a signal proportional to its displacement and direction of displacement from said predetermined position, means for moving said position responsive means to a position where the signal therefrom bears a predetermined relationship to the signal from said first means, and means for indicating the distance between said position responsive means and said reference axis.

4. In combination with roll grinding apparatus having means for supporting a roll and aligning the axis thereof with a reference axis, means positionable on the roll and effective to indicate the center thereof, means responsive to said positionable means for indicating the displacement of the center of the roll from the reference axis, position responsive means for indicating the distance from the center of the roll to the surface thereof, and means for algebraically adding said distance and said displacement.

5. In combination with roll grinding apparatus having means for supporting a roll and aligning the axis thereof with a reference axis, means positionable on the roll and effective to indicate the center thereof, means responsive to said positionable means providing a first electric signal indicative of the displacement of the center of the roll from the reference axis, position responsive means providing a second electric signal proportional to distance from the center of the roll to the surface thereof, and means for algebraically adding the first and second signals.

6. In combination with roll grinding apparatus having means for supporting a roll and aligning the axis thereof with a reference axis, means positionable on the roll and effective to indicate the center thereof, first means responsive to said positionable means providing a first electric signal indicative of the displacement of the center of the roll from the reference axis, means on the apparatus movable towards and away from the roll, second means mounted on said movable means arranged to engage the surface of the roll, said second means being effective to provide an electric signal indicative of the deviation in the point of engagement from a predetermined position, means for moving said movable means until the signals from said first and second means are equal, and means for indicating the position of said movable means with respect to the reference axis.

References Cited

UNITED STATES PATENTS

| | | | |
|---|---|---|---|
| 1,808,392 | 6/1931 | Waldrich | 51—49 |
| 3,088,250 | 5/1963 | Hold et al. | 51—49 X |
| 3,263,374 | 8/1966 | Stuckey et al. | 51—49 X |

LESTER M. SWINGLE, *Primary Examiner.*